Aug. 10, 1943.   B. E. SHAW   2,326,574
PRESSURE GAUGE FOR USE WITH AIR VOLUME CONTROLS
Filed Oct. 23, 1939
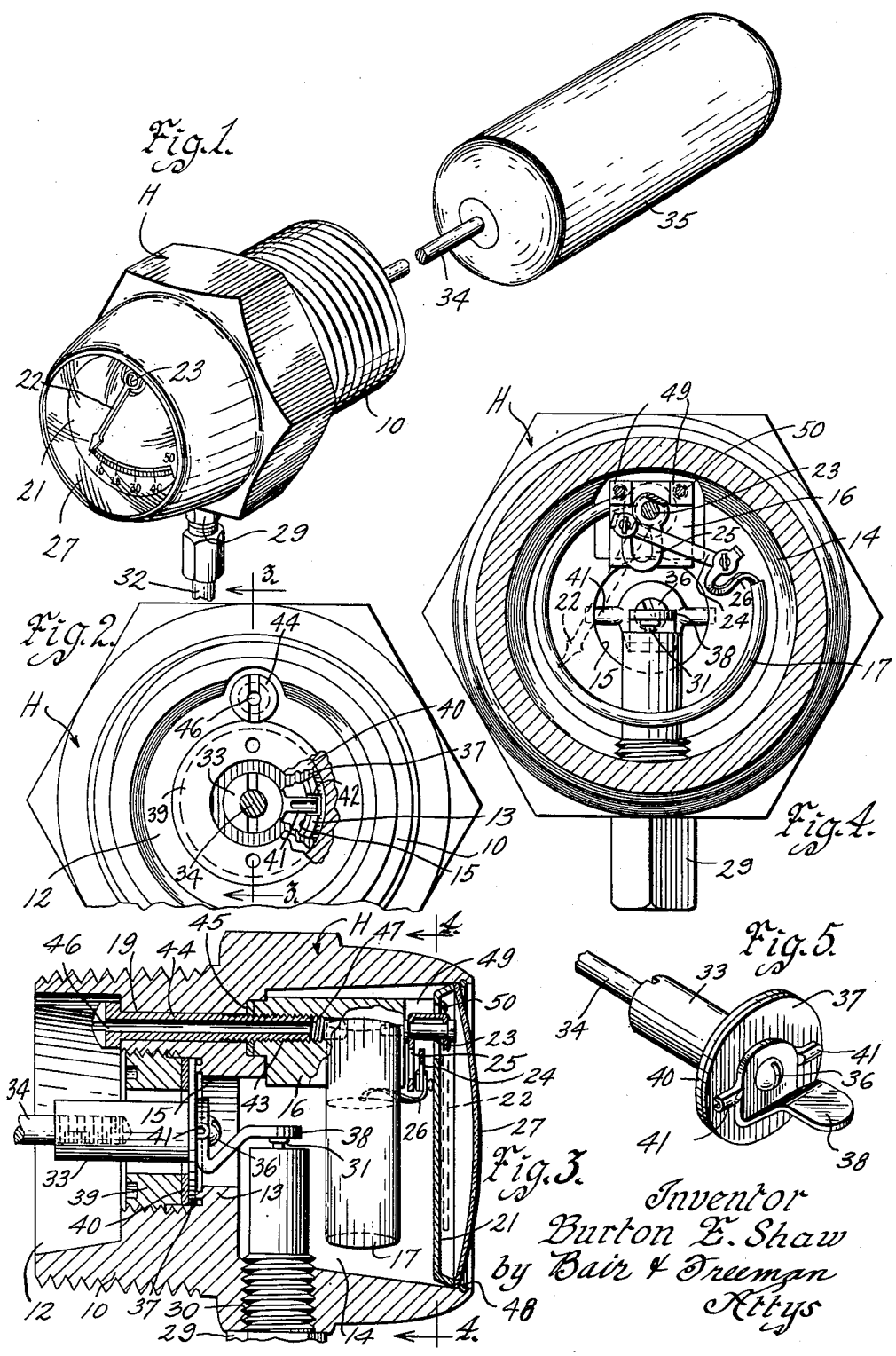

Patented Aug. 10, 1943

2,326,574

UNITED STATES PATENT OFFICE 2,326,574

PRESSURE GAUGE FOR USE WITH AIR VOLUME CONTROLS

Burton E. Shaw, Bristol, Ind., assignor to Penn Electric Switch Co., Goshen, Ind., a corporation of Iowa Application October 23, 1939, Serial No. 300,815

3 Claims. (Cl. 73—109)

The present invention relates to a combined air volume control and pressure gauge particularly adapted for controlling the volume of air in a water pressure tank of the kind utilizing a pneumatic head on the water.

An object of the invention is to provide a relatively small housing within which both float valve mechanism and a pressure gauge mechanism are compactly mounted, the housing having a float for actuating the float valve extending inwardly from the housing and located in the water tank and the dial of the pressure gauge mechanism spanning the outer end of the housing.

Another object is to so design the housing that it can contain an efficient pressure gauge mechanism without interference with the action of the valve and without making of the entire device a bulky fitting, but on the other hand one that is comparatively small and neat in appearance and eliminates the usual method of having a float valve mounted on the tank and a standard pressure gauge connected as an appurtenance thereto.

Still another object is to provide a construction in which the Bourdon tube has a mounting boss which can be secured in position in the housing by a screw, the screw serving also as a means for communicating the pressure from the inner end of the fitting to the interior of the Bourdon tube.

With the foregoing and other contemplated as well as obvious objects in view, the invention comprises the combination of elements and arrangement of parts so combined as to coact and cooperate with each other in the performance of the functions and the accomplishment of the results herein contemplated, and comprises in two of its adaptations the species or preferred forms illustrated in the accompanying drawing, wherein Figure 1 is a perspective view of a combined air volume control and pressure gauge embodying my invention;

Figure 2 is an enlarged end elevation of the right hand end of the fitting in Figure 1, the float rod being shown in section, and other parts broken away and also shown in section;

Figure 3 is a vertical sectional view on the line 3—3 of Figure 2;

Figure 4 is a vertical sectional view on the line 4—4 of Figure 3; and

Figure 5 is a detail perspective view of a float arm, a diaphragm and an actuating arm of my device.

On the accompanying drawing, I have used the reference character H to indicate generally a housing. The housing H is provided with threads 10 for the purpose of screwing the housing H into a boss on a water tank. The housing H has a bore horizontally therethrough provided with inner and outer portions 12 and 14. A partition 13 separates the bore portions 12 and 14 and is provided with an opening 15 therethrough.

A boss 16 is provided which serves as a mounting boss for a Bourdon tube 17. The Bourdon tube is secured to the mounting boss or formed as a part of it. The boss 16 is provided with a threaded opening 43 adapted to receive a screw 44. The screw 44 extends through an enlarged opening 19 and serves to rigidly mount the boss in position. A gasket 45 is provided to effect a seal while communication from the interior of the tank to the Bourdon tube is provided by the longitudinal bore 46 through the screw 44. The screw communicates with a bore 47 in the boss 16 which, in turn, communicates with the Bourdon tube. A pivot post 23 for a gauge needle 22 is mounted on the boss 16. A dial 21 is mounted on a pair of posts 49 extending outwardly from the boss 16. Screws 50 extend through the dial and into the posts 49 for this purpose. A lens 27 is held in position in front of the dial 21 by an annular retainer wire 48.

The needle 22 is operatively connected to the free closed end of the Bourdon tube 17, as shown in Figure 4. The connection consists of a link 24 pivoted to a lever portion 25 of the needle 22 and to an extension 26 of the Bourdon tube. When the pressure rises, it will be obvious how the Bourdon tube expands in diameter and pulls the link 24 to the right and downwardly, thus swinging the needle 22 about its axis to sweep across the dial 21. The dial 21 spans the outer end of the housing H and encloses the operating mechanism of the pressure gauge. The needle 22 in turn is enclosed by a transparent disc or lens 27, which is held in position by an annular retainer wire 48.

A valve casing 29 is screwed transversely into a threaded opening 30 of the housing H. Mounted in the casing 29 is a valve core 31 of the usual type used in pneumatic tire valves. The core 31 is thereby readily replaceable when necessary and also these types of valves are readily obtainable at service stations, automobile supply stores and the like. A tube 32 extends to the water pump for the tank in which the housing H is mounted in the manner disclosed in Penn Patent No. 2,004,417.

For actuating the valve core 31, I provide a float boss 33 into which a float rod 34 is screwed. A float 35 is mounted on the rod 34.

A flexible diaphragm 37 perforated at its center is provided. An actuating arm 38 (see Figure 5) is positioned against the outer surface of the diaphragm and the float boss 33 against the inner side thereof. A screw 36 extends through the actuating arm 38 and into the boss 33. When the screw is tightened, the diaphragm 37 seals the perforation of the diaphragm between the elements 33 and 38.

The peripheral edge of the diaphragm 37 is sealed in position relative to the housing H by a spanner ring 39 between which and the diaphragm a washer 40 is provided. The actuating arm 38 has a pair of trunnions 41 formed thereon which seat in U-shaped sockets 42 formed in the inner face of the partition 13, as shown in Figure 2. The trunnions 41 serve to prevent pressure from the inner end of the housing H forcing the diaphragm 37 to a cone shape and placing it under excessive strain. They also predetermine the axis on which the float arm 34 and the actuating arm 38 rotate with relation to the valve core 31, in the manner shown in the Penn patent hereinbefore mentioned.

My invention, it will be noted, is readily adapted to have the entire gauge mechanism mounted within the housing H so that the gauge dial and covering lens therefor span the outer end of the housing to enclose all the operating mechanism without, however, making it impossible to get at the valve, due to the particular way it is mounted in position. The valve casing 29 can be removed for examination or replacement of the valve core 31 without in any way having to secure entrance into the housing H itself.

I have illustrated and described my improvement in an embodiment which I have found very satisfactory. I have not attempted to illustrate or describe certain adaptations or modifications which I contemplate, or the various uses and adjustments possible, as it is believed that the foregoing disclosure will enable those skilled in the art to which this invention appertains to embody or adapt my improvements as may be desired.

Having thus described my invention, I now claim and desire to secure by Letters Patent:

1. In a structure of the kind disclosed, an elongated housing having threads on one end portion thereof for connection to a threaded opening of a tank, said housing having a recess forming a chamber in the other end portion thereof, a dial plate spanning said recess, gauge mechanism having means responsive to pressure within said chamber back of said dial plate and means for communicating pressure from the outer threaded end of said housing to the pressure responsive means comprising a tubular screw, said tubular screw also mounting the gauge mechanism in position within said chamber.

2. In a structure of the kind disclosed, a housing having means on one end portion thereof for pneumatic connection with the interior of a tank, said housing having a recess forming a chamber in the other end portion thereof, a partition in said housing between said end portions, a dial plate spanning said recess, gauge mechanism having means responsive to pressure and provided with a mounting boss within said chamber back of said dial plate, and means for communicating pressure from said first end portion of said housing through said partition to the pressure responsive means comprising a tubular screw through said partition and entering said mounting boss, said mounting boss having a passageway affording communication between said screw and the pressure responsive means.

3. In a structure of the kind disclosed, a housing having means on one end portion thereof for pneumatic connection with the interior of a tank, said housing having a recess forming a chamber in the other end portion thereof, a partition in said housing between said end portions, a dial plate spanning said recess, gauge mechanism having means responsive to pressure and provided with a hollow mounting boss within said chamber back of said dial plate, and means for communicating pressure from said first end portion of said housing through said partition to the pressure responsive means comprising a screw having a head within said first end portion, said screw extending through said partition and being threaded into the boss of said pressure responsive means, said screw having a bore therethrough to afford communication between the tank and the pressure responsive means.

BURTON E. SHAW.